(No Model.)

J. E. SUMMERS.
FURNITURE BRACE.

No. 534,530. Patented Feb. 19, 1895.

WITNESSES:
John A Rennie
Fred Acker

INVENTOR
J. E. Summers
BY Munn & Co
ATTORNEYS.

UNITED STATES PATENT OFFICE.

JAMES E. SUMMERS, OF CLIFTON FORGE, VIRGINIA.

FURNITURE-BRACE.

SPECIFICATION forming part of Letters Patent No. 534,530, dated February 19, 1895.

Application filed August 25, 1894. Serial No. 521,311. (No model.)

*To all whom it may concern:*

Be it known that I, JAMES E. SUMMERS, of Clifton Forge, in the county of Alleghany and State of Virginia, have invented a new and Improved Furniture-Brace, of which the following is a full, clear, and exact description.

My invention relates to an improvement in furniture braces, and it has for its object to provide a brace or tension device capable of application to the legs of furniture to strengthen the same, and likewise applicable to the frame of a bedstead to exert tension thereon, and the invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1:
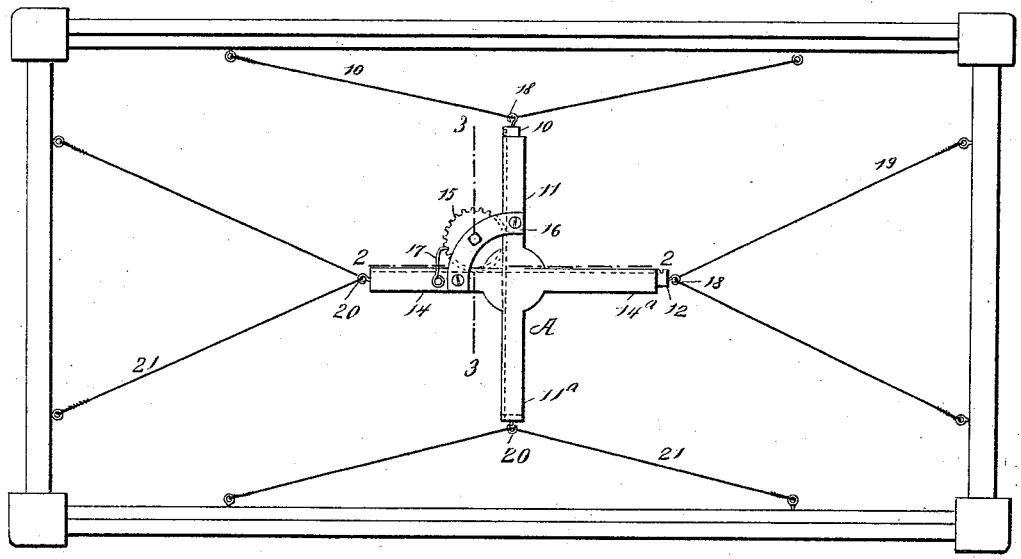
Figure 2:
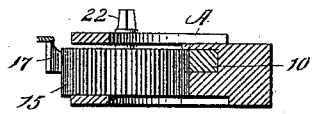
Figure 3:
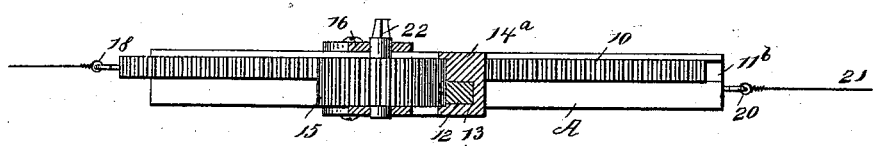

Figure 1 is a plan view of the device applied to a bedstead. Fig. 2 is a section taken substantially on the line 2—2 of Fig. 1; and Fig. 3 is a section taken substantially on the line 3—3 of Fig. 1.

In carrying out the invention a casing A is employed, which is preferably of somewhat cruciform shape, being shown in the drawings as being provided with four arms or members, but a less or a greater number may be used if in practice it is found desirable.

When four members are employed in the construction of the casing A, a rack 10 is held to slide in ways $11^b$, produced in opposite members 11 and $11^a$ of the casing, the member $11^a$ being closed at its outer end while the member 11 is open to admit of the rack moving outward therefrom. A second rack 12, is held to slide in ways 13, produced in opposite members 14 and $14^a$ of the casing, the member $14^a$ being closed at its end and the member 14 open to admit of the outward passage of the said rack 12. A pinion 15 is supported in suitable bearings 16 attached to convenient members of the casing, and the said pinion meshes with the teeth of both of the racks 10 and 12, a suitable opening being made in the casing to receive the pinion where the two racks cross, one of them being located above the other so that they will not interfere with each other in operation; and the said pinion 15 is provided with a pawl 17, pivoted upon the casing, which will hold the pinion stationary, permitting it to turn in one direction but not in the other.

In the application of the invention, eyes 18, are secured to the outer ends of the racks 10 and 12, and the said eyes receive wires 19, which are attached to the bedstead frame, for example, one wire at the side and the other at the end, or to corresponding parts of whatever article of furniture is to be braced; while eyes 20, are secured to the outer ends of the members 14 and $11^a$ of the casing, or those members which are closed at the end, and these eyes receive wire cables or their equivalents 21, which are attached to the opposite end and opposite side of the said article of furniture, as illustrated in Fig. 1. Thus it is evident that by applying a key to the trunnion 22 of the pinion, which trunnion is adapted to receive a key or wrench, and turning the trunnion in a direction to cause the pinion to draw the racks 10 and 12 inward, any desired amount of tension may be applied to the object to which the brace is applied, whereas, by simply releasing the pinion from the pawl 17 the racks may move outward and relieve the frame from whatever tension there may have been exerted thereon.

Having thus described my invention, I claim as new and desire to secure by Letters Patent—

1. A brace for furniture, comprising a casing adapted to be secured to the article to be braced, racks held to slide in the casing at angles to each other and also adapted to be secured to the article, a pinion engaging both of the said racks to move them simultaneously in and out of the casing, and means for locking the pinion in position, substantially as described.

2. A brace for furniture, comprising an armed casing having an opening therein and adapted to be secured to the article to be braced, racks sliding in the casing at right angles to each other and also adapted to be secured to the article, a pinion journaled adjacent to the opening of the casing and projecting into the casing and engaging both of the said racks, to move them simultaneously in and out of the casing, and a detent engaging the pinion, substantially as described.

3. In a brace for furniture, the combination, with a casing of substantially cruciform shape, racks having sliding movement in the casing at angles to one another, one rack crossing the other and extending at one end through said casing, each rack being provided at its outer end with a device adapted to receive a wire or its equivalent, the casing being likewise provided with equivalent devices at the extremities of its members through which the racks do not extend, and adapted to receive cables or their equivalents, a pinion engaging with the said racks and carried by the casing, means for operating the pinion, and a detent engaging with said pinion, substantially as and for the purpose set forth.

JAMES E. SUMMERS.

Witnesses:
W. H. DAVIS,
J. D. SHOTT.